United States Patent
Khare

(10) Patent No.: US 6,274,533 B1
(45) Date of Patent: Aug. 14, 2001

(54) DESULFURIZATION PROCESS AND NOVEL BIMETALLIC SORBENT SYSTEMS FOR SAME

(75) Inventor: Gyanesh P. Khare, Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/460,067

(22) Filed: Dec. 14, 1999

(51) Int. Cl.[7] ............................. B01J 20/02; B01J 20/06
(52) U.S. Cl. ................. 502/343; 502/305; 502/308; 502/310; 502/311; 502/312; 502/313; 502/314; 502/315; 502/316; 502/317; 502/318; 502/322; 502/323; 502/324; 502/325; 502/330; 502/331; 502/332; 502/336; 502/337; 502/338; 502/341; 502/344; 502/345; 502/346; 502/347; 502/348; 502/349; 502/352; 502/353; 502/406; 502/407; 502/414; 502/415; 502/517
(58) Field of Search ...................... 502/305, 308, 502/310, 311, 312, 313, 314, 315, 316, 317, 318, 324, 325, 330, 331, 332, 336, 337, 338, 343, 344, 345, 346, 347, 348, 349, 352, 353, 354, 406, 407, 414, 415, 517, 321, 322, 323, 341

(56) References Cited

U.S. PATENT DOCUMENTS

| | | | |
|---|---|---|---|
| 4,673,557 | * | 6/1987 | Nieskens et al. ............ 423/230 |
| 4,849,202 | * | 7/1989 | Lee .......................... 423/574 R |
| 5,401,475 | * | 3/1995 | Ayala et al. ................. 422/190 |
| 5,439,867 | * | 8/1995 | Khare et al. ................. 502/407 |
| 5,703,003 | * | 12/1997 | Siriwardane ................ 502/400 |
| 5,726,117 | * | 3/1998 | Khare et al. ................. 502/400 |
| 5,866,503 | * | 2/1999 | Siriwardane ................ 502/439 |
| 5,914,292 | * | 6/1999 | Khare et al. ................. 502/406 |
| 5,928,980 | * | 7/1999 | Gangwal et al. .............. 502/20 |
| 5,935,420 | * | 8/1999 | Baird, Jr. et al. ............ 208/213 |
| 5,958,830 | * | 9/1999 | Khare et al. ................. 502/407 |
| 5,985,169 | * | 11/1999 | Miller et al. ................. 423/700 |

* cited by examiner

Primary Examiner—Elizabeth D. Wood
(74) Attorney, Agent, or Firm—Jack E. Phillips

(57) ABSTRACT

Novel sorbent systems for the desulfurization of cracked-gasoline are provided which are comprised of a bimetallic promotor on a particulate support such as that formed of zinc oxide and an inorganic or organic carrier. Such bimetallic promoters are formed of at least two metals of the group consisting of nickel, cobalt, iron, manganese, copper, zinc, molybdenum, tungsten, silver, tin, antimony and vanadium with the valence of same being reduced, preferably to zero. Processes for the production of such sorbents are provided wherein the sorbent is prepared from impregnated particulate supports or admixed to the support composite prior to particulation, drying, and calcination. Further disclosed is the use of such novel sorbents in the desulfurization of cracked-gasoline whereby there is achieved not only removal of sulfur but also an increase in the olefin retention in the desulfurized product. Such sorbents can also be utilized for the treatment of other sulfur-containing streams such as diesel fuels.

25 Claims, No Drawings

DESULFURIZATION PROCESS AND NOVEL BIMETALLIC SORBENT SYSTEMS FOR SAME

This invention relates to the removal of sulfur from fluid streams of cracked-gasolines. In another aspect this invention relates to sorbent compositions suitable for use in the desulfurization of fluid streams of cracked-gasolines. A further aspect of this invention relates to a process for the production of sulfur sorbents for use in the removal of sulfur bodies from fluid streams of cracked gasolines.

BACKGROUND OF THE INVENTION

The need for cleaner burning fuels has resulted in a continuing world wide effort to reduce sulfur levels in gasoline and diesel fuels. The reducing of gasoline and diesel sulfur is considered to be a means for improving air quality because of the negative impact the fuel sulfur has on the performance of automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbon and oxides of nitrogen and carbon monoxide. Such emissions are catalyzed by sunlight to form ground level ozone, more commonly referred to as smog.

Most of the sulfur in gasoline comes from the thermally processed gasolines. Thermal processed gasolines such, as for example, thermally cracked gasoline, visbreaker gasoline, coker gasoline and catalytically cracked gasoline (hereinafter collectively called "cracked-gasoline") contains in part olefins, aromatics, and sulfur-containing compounds.

Since most gasolines, such as for example automobile gasolines, racing gasolines, aviation gasoline and boat gasolines contain a blend of at least in part cracked-gasoline, reduction of sulfur in cracked-gasoline will inherently serve to reduce the sulfur levels in such gasolines.

The public discussion about gasoline sulfur has not centered on whether or not sulfur levels should be reduced. A consensus has emerged that lower sulfur gasoline reduces automotive emissions and improves air quality. Thus the real debate has focused on the required level of reduction, the geographical areas in need of lower sulfur gasoline and the time frame for implementation.

As the concern over the impact of automotive air pollution continues, it is clear that further efforts to reduce the sulfur levels in automotive fuels will be required. While the current gasoline products contain about 330 part per million with continued efforts by the Environmental Protection Agency to secure reduced levels, it has been estimated that gasoline will have to have less than 50 parts per million of sulfur by the year 2010. (See Rock, K. L., Putman H. M., Improvements in FCC Gasoline Desulfurization via "Catalytic Distillation" presented at the 1998 National Petroleum Refiners Association Annual Meeting (AM-98-37)).

In addition to the need to be able to produce low sulfur content automotive fuels, there is also a need for a process which will have a minimal effect on the olefin content of such fuels so as to maintain the octane number (both research and motor octane number). Such a process would be desirable since saturation of olefins greatly affects the octane number. Such adverse effect on olefin content is generally due to the severe conditions normally employed to remove thiophenic compounds such as, for example, thiophenes and alkyl dibenzothiophenes, which are some of the most difficult sulfur-containing compounds to be removed from cracked-gasolines. In addition, there is a need to avoid a system wherein the conditions are such that the aromatic content of the cracked-gasoline is also lost through saturation.

Thus there is a need for a process wherein desulfurization is achieved and olefin retention is improved.

While it has been shown in my copending applications Desulfurization and Novel Sorbents for Same, Ser. No. 09/431,454, filed Nov. 1, 1999, and Ser. No. 09/431,370, filed Nov. 1, 1999, that a suitable system for the desulfurization of cracked-gasolines or diesel fuels is that employing a sorbent comprised of a reduced valence nickel or reduced valence cobalt metal on a zinc oxide, silica, alumina support, there is a continuous effort to develop additional systems which permit the desired desulfurization of such cracked-gasolines or diesel fuels and which will provide for alternative or improved desulfurization conditions to permit variations within the operation of the process.

It is thus an object of the present invention to provide a novel sorbent system for the removal of sulfur from fluid streams of cracked-gasoline.

Another object of this invention is to provide a process for the production of novel sorbents which are useful in the desulfurization of cracked-gasoline.

A further object of this invention is to provide a process for the removal of sulfur-containing compounds from cracked gasoline which minimizes the loss of olefin values in the resulting product.

A still further object of this invention is to provide a desulfurized cracked-gasoline that contains less than about 100 parts per million of sulfur based on the weight of the desulfurized cracked-gasoline and which provides for enhanced olefin retention in the cracked-gasoline.

Other aspects, objects and the several advantages of this invention will be apparent from the following description of the invention and the appended claims.

The present invention is based upon my discovery that through the utilization of a bimetallic promotor derived from a metal, metal oxide or metal oxide precursor wherein the metals are selected from the group consisting of cobalt, nickel, iron, manganese, copper, zinc, molybdenum, tungsten, silver, tin, vanadium and antimony and mixtures thereof and wherein the metals of such bimetallic promoter are in a substantially reduced valence state, preferably zero, and wherein such bimetallic promotor composite is supported on a suitable support there is achieved a novel sorbent composition which permits the ready removal of sulfur from cracked-gasoline while providing an unexpected improvement in olefin content retention in the resulting cracked-gasoline.

Accordingly, in one aspect of the present invention there is provided a novel sorbent suitable for the desulfurization of cracked-gasolines which is comprised of a bimetallic promotor on a suitable support wherein the valence of each of the metals of the bimetallic promoter have been substantially reduced and such reduced metals are present in an amount to permit the removal of sulfur from a cracked-gasoline while providing for enhanced olefin retention in the treated cracked-gasoline stream.

In accordance with another aspect of the present invention, there is provided a process for the preparation of novel sorbent compositions which comprises forming a suitable support in which the bimetallic promotor is well dispersed. Regardless of the manner in which the components of the novel sorbents of this invention are combined, the preparation comprises forming a wet mix, dough, paste or slurry thereof, particulating the wet mix, dough, paste or slurry thereof to form a particulate granule, extrudate, tablet, sphere, pellet, or microsphere thereof, drying the resulting solid particulate and calcining the dried particulate. The resulting calcined bimetallic promotor containing composition is then reduced with a suitable reducing agent, such as hydrogen, so as to produce a sorbent composition wherein the valence of the metals of the bimetallic promotor is substantially reduced and wherein the bimetallic promotor is present in an amount which is sufficient to permit the removal with same of sulfur from a cracked-gasoline.

In accordance with a further aspect of the present invention there is provided a process for the desulfurization of a cracked-gasoline which comprises desulfurizing in a desulfurization zone a cracked-gasoline with a bimetallic promotor containing sorbent, separating the desulfurized cracked-gasoline from the resulting sulfurized sorbent; regenerating at least a portion of the sulfurized sorbent so as to produce a regenerated desulfurized sorbent; activating at least a portion of the regenerated desulfurized sorbent to produce a bimetallic sorbent having a reduced metal valence content; and thereafter returning at least a portion of the resulting bimetallic promotor containing sorbent to the desulfurization zone.

DETAILED DESCRIPTION OF THE INVENTION

The term "gasoline" as employed herein is intended to mean a mixture of hydrocarbons boiling from about 100° F. to approximately 400° F. or any fraction thereof. Such hydrocarbons will include, for example, hydrocarbon streams in refineries such as naphtha, straight-run naphtha, coker naphtha, catalytic gasoline, visbreaker naphtha, alkylate, isomerate or reformate.

The term "cracked-gasoline" as employed herein is intended to mean hydrocarbons boiling from about 100° F. to approximately 400° F. or any fraction thereof that are products from either thermal or catalytic processes that crack larger hydrocarbon molecules into smaller molecules. Examples of thermal processes include coking, thermal cracking and visbreaking. Fluid catalytic cracking and heavy oil cracking are examples of catalytic cracking. In some instances the cracked-gasoline may be fractionated and/or hydrotreated prior to desulfurization when used as a feed in the practice of this invention.

The term "sulfur" as employed herein is intended to mean those organosulfur compounds such as mercaptans or those thiophenic compounds normally present in cracked gasolines which include among others thiophene, benzothiophene, alkyl thiophenes, alkyl benzothiophenes and alkyldibenzothiophenes as well as the heavier molecular weights of same which are normally present in a diesel fuel of the types contemplated for processing in accordance with the present invention.

The term "gaseous" as employed herein is intended to mean that state in which the feed cracked-gasoline or diesel fuel is primarily in a vapor phase.

The term "substantially reduced bimetallic promotor valence" as employed herein is intended to mean that a large portion of the valence of the metal components of the composition is reduced to a value of three or less, preferably zero.

The term "bimetallic promotor" as used herein is intended to mean a promotor composite derived from two or more metals, metal oxides or metal oxide precursors wherein the metal is selected from the group consisting of cobalt, nickel, iron, manganese, zinc, copper, molybdenum, silver, tin, vanadium and antimony and wherein the bimetallic promotor composite is in a substantially reduced valence state and wherein such promotor is present in an effective amount to permit the removal of sulfur from cracked-gasolines.

The term "olefin retention" or "olefin content retention" as used herein is intended to mean that amount of olefin retained in the cracked-gasoline after desulfurization as compared to the olefin content of the cracked-gasoline stream prior to desulfurization.

The term "particulated support" as used herein is intended to mean a support particle of a size of from 20 microns to 0.5 inch.

The bimetallic promotor sorbent used in the present invention comprises a support having combined therewith a dispersion of effective amounts of a bimetallic promotor. The support material is comprised of zinc oxide in combination with any suitable inorganic and organic carriers. Examples of suitable inorganic carriers include silica, silica gel, alumina, clays such as attapulgus clay, china clay, diatomaceous earth, kaolin and kiesleguhr, aluminum silicate, silica-alumina, titania, zirconia, zinc aluminate, zinc titanate, zinc silicate, calcium aluminate, calcium silicate, magnesium silicate, magnesium aluminate, magnesium titanate, synthetic zeolites and natural zeolites. Examples of organic carriers include activated carbon, coke or charcoal and carbon-containing molecular sieves.

In one presently preferred embodiment of this invention the support is comprised of zinc oxide, silica and alumina.

Bimetallic promotor compounds may be added to the support components prior to drying and calcining, or by impregnating the dried and calcined support particulates with a solution either aqueous or organic that contains the elemental metals, metal oxides or metal-containing compounds of the selected promotor system.

Regardless of the details of how the sorbent components are combined with the support, the resulting sorbent compositions are dried at a temperature of about 150° F. to about 350° F. for a period of from about 1 to about 24 hours and finally calcined in air at a temperature of about 400° F. to about 1500° F., preferably about 800° F. to about 1300° F., for a period of 0.5 to about 12 hours, preferably about 1 to about 5 hours.

In the formation of the bimetallic sorbent systems of the present invention the appropriate metals, metal oxides or metal oxide precursors should be selected such that the ratio of the two metals forming the promotor are in the range of from about 20:1 to about 1:20.

In a presently preferred embodiment of this invention the bimetallic promotor is a mixture of nickel and cobalt on a particulate support comprised of zinc oxide, silica and alumina.

In a further presently preferred embodiment of this invention wherein the bimetallic promotor is formed of nickel and cobalt, the ratio of the two component metals is in the range of about 1:1.

The zinc oxide used in the preparation of the presently preferred sorbent composition can either be in the form of zinc oxide, or in the form of one or more zinc compounds that are convertible to zinc oxide under the conditions of preparation described herein. Examples of such zinc compounds include, but are not limited to, zinc sulfide, zinc sulfate, zinc hydroxide, zinc carbonate, zinc acetate, and zinc nitrate. Preferably, the zinc oxide is in the form of powdered zinc oxide.

The silica used in the preparation of such sorbent compositions may be either in the form of silica or in the form of one or more silicon-containing compounds. Any suitable type of silica may be employed in the sorbent compositions of the present invention. Examples of suitable types of silica include diatomite, silicalite, silica colloid, flame-hydrolyzed silica, hydrolyzed silica, silica gel and precipitated silica, with diatomite being presently preferred. In addition, silicon compounds that are convertible to silica such as silicic acid, sodium silicate and ammonium silicate can also be employed. Preferably, the silica is in the form of diatomite.

The starting alumina component of the preferred sorbent composition can be any suitable commercially available alumina material including colloidal alumina solutions and, generally, those alumina compounds produced by the dehydration of alumina hydrates.

The zinc oxide will generally be present in the sorbent composition in an amount in the range of from about 10 weight percent to about 90 weight percent, and preferably in an amount in the range of from about 15 to about 60 weight percent when such weight percents are expressed in terms of the zinc oxide based upon the total weight of the sorbent composition.

The silica will generally be present in the sorbent composition in an amount in the range of from about 5 weight percent to about 85 weight percent, preferably in an amount in the range of from about 20 weight percent to about 60 weight percent when the weight percents are expressed in terms of the silica based upon the total weight of the sorbent composition.

The alumina will generally be present in the sorbent composition in an amount in the range of from about 5.0 weight percent to about 30 weight percent, preferably from about 5.0 weight percent to about 15 weight percent when such weight percents are expressed in terms of the weight of the alumina compared with the total weight of the sorbent system.

In the manufacture of the presently preferred sorbent composition, the primary components of zinc oxide, silica and alumina are combined together in appropriate proportions by any suitable manner which provides for the intimate mixing of the components to provide a substantially homogeneous mixture.

Any suitable means for mixing the sorbent components can be used to achieve the desired dispersion of the materials. Such means include, among others, tumblers, stationary shells or troughs, Muller mixers, which are of the batch or continuous type, impact mixers and the like. It is presently preferred to use a Muller mixer in the mixing of the silica, alumina and zinc oxide components.

Once the sorbent components are properly mixed to provide a shapeable mixture, the resulting mixture can be in the form of wet mix, dough, paste or slurry. If the resulting mix is in the form of a wet mix, the wet mix can be densified and thereafter particulated through the granulation of the densified mix following the drying and calcination of same. When the admixture of zinc oxide, silica and alumina results in a form of the mixture which is either in a dough state or paste state, the mix can be shaped to form a particulate granule, extrudate, tablet, sphere, pellet or microsphere. Presently preferred are cylindrical extrudates having from $1/32$ inch to $1/2$ inch diameter and any suitable length. The resulting particulate is then dried and then calcined. When the mix is in the form of a slurry, the particulation of same is achieved by spray drying the slurry to form microspheres thereof having a size of from about 20 to about 500 microns.

Such microspheres are then subjected to drying and calcination. Following the drying and calcination of the particulated mixture the resulting particulate can be impregnated with the selected bimetallic promotor components in the form of a solution, either aqueous or organic, that contains the elemental metals, metal oxide or metal oxide precursor compounds. If desired the bimetallic promotor component may be incorporated in the shapeable mixture which can be in the form of a wet mix, dough, paste or a slurry; which is then shaped to form a particulate granule, extrudate, tablet sphere, pellet or microsphere.

Drying of the support particles is carried out at a temperature in the range of about 150° F. to about 350° F., for a period of time in the range of about 1 to about 24 hours.

Calcination of the support particles is carried out at a temperature in the range of about 400° F. to about 1500° F., preferably from about 800° F. to about 1300° F. for a period of time in the range of about 1 to about 24 hours.

Impregnation of the particulate support can be achieved by use of solutions of the selected metal which is formed of the metal per se, metal oxide or a precursor for same. Such impregnation can be carried out in separate steps whereby the particulate support is dried or dried and calcined prior to the addition of the second metal component to the support.

Following impregnation of the particulate compositions with the appropriate bimetallic promotor, the resulting impregnated particulate is then subjected to drying and calcination under the conditions noted supra prior to subjection of the calcined particulate to reduction with a reducing agent, preferably hydrogen.

The elemental metals, metal oxides or metal-containing compounds of the selected bimetallic promotor can be added to the particulated mixture by impregnation of the mixture with a solution, either aqueous or organic that contains the selected elemental metal, metal oxide or metal containing compounds.

The impregnation solution is any aqueous or organic solution and amounts of such solutions are such to provide for the impregnation of the particulate support such that the final bimetallic composition, when reduced contains a bimetallic promotor content sufficient to permit the removal of sulfur from streams of cracked gasoline when contacted with same while effecting an enhancement of the olefin retention in the resulting cracked-gasoline product.

Once the bimetallic promotor has been incorporated in the particulate support, the desired reduced valence of the metals is achieved by drying the resulting composition followed by calcination and thereafter subjecting the resulting calcined composition to reduction with a suitable reducing agent, preferably hydrogen, so as to produce a composition having a substantially reduced valence metals content which is present in an amount to permit the removal of sulfur from a cracked-gasoline and which will achieve the desired enhanced olefin retention.

The solid bimetallic promotor compositions of this invention have the ability to react with and/or chemisorb organosulfur compounds, such as thiophenic compounds. It is also preferable that the sorbents remove diolefins and other gum forming compounds from the cracked-gasoline.

From the above, it can be appreciated in a presently preferred embodiment of this invention that the sorbent compositions which are useful in the desulfurization process of this invention can be prepared by a process which comprises:

(a) admixing zinc oxide, silica and alumina so as to form a mix of same in the form of one of a wet mix, dough, paste or slurry;

(b) particulating the resulting mix to form particulates thereof in the form of one of granules, extrudates, tablets, pellets, spheres or microspheres;

(c) drying the resulting particulate;

(d) calcining the dried particulate;

(e) impregnating the resulting calcined particulate with bimetallic promotor;

(f) drying the impregnated particulate;

(g) calcining the resulting dried particulate; and (h) reducing the calcined particulate product of (g) with a suitable reducing agent so as to produce a particulate composition having a substantially reduced bimetallic promotor content therein and wherein the reduced valence bimetallic promotor content is present in an amount sufficient to permit the removal with same of sulfur from a cracked-gasoline stream when contacted with the resulting substantially reduced valence bimetallic promotor containing particulated sorbent.

If desired the components of the bimetallic promotor can be added to the support individually rather than by coimpregnation.

In addition, the impregnated support can be dried and calcined after the addition of each component of the bimetallic promotor.

Also, the components of the bimetallic promotor can be added to the support mix prior to particulation of the sorbent composition, in which case the resulting composition can thereafter be dried and calcined.

The process to use the novel sorbents to desulfurize cracked-gasoline to provide a desulfurized cracked-gasoline with enhanced olefin retention comprises:

(a) desulfurizing in a desulfurization zone a cracked-gasoline with a solid reduced valence bimetallic promotor containing sorbent;

(b) separating the desulfurized cracked-gasoline from the resulting sulfurized solid sorbent;

(c) regenerating at least a portion of the sulfurized solid sorbent to produce a regenerated desulfurized solid sorbent;

(d) reducing at least a portion of the regenerated solid sorbent to produce a solid reduced valence bimetallic promotor containing sorbent; and thereafter (e) returning at least a portion of the regenerated solid reduced valence bimetallic promotor containing sorbent to the desulfurization zone.

The desulfurization step (a) of the present invention is carried out under a set of conditions that includes total pressure, temperature, weight hourly space velocity and hydrogen flow. These conditions are such that the solid reduced nickel-containing sorbent can desulfurize the cracked-gasoline or diesel fuel to produce a desulfurized cracked-gasoline or desulfurized diesel fuel and a sulfurized sorbent.

In carrying out the desulfurization step of the process of the present invention, it is preferred that the feed cracked-gasoline be in a vapor phase. However, in the practice of the invention it is not essential, albeit preferred, that the feed be totally in a vapor or gaseous state.

The total pressure can be in the range of about 15 psia to about 1500 psia. However, it is presently preferred that the total pressure be in a range of from about 50 psia to about 500 psia.

In general, the temperature should be sufficient to keep the cracked-gasoline essentially in a vapor phase. While such temperatures can be in the range of from about 100° F. to about 1000° F., it is presently preferred that the temperature be in the range of from about 400° F. to about 800° F. when treating as cracked-gasoline.

Weight hourly space velocity (WHSV) is defined as the pounds of hydrocarbon feed per pound of sorbent in the desulfurization zone per hour. In the practice of the present invention, such WHSV should be in the range of from about 0.5 to about 50, preferably about 1 to about 20 $hr^{-1}$.

In carrying out the desulfurization step, it is presently preferred that an agent be employed which interferes with any possible chemisorbing or reacting of the olefinic and aromatic compounds in the fluids which are being treated with the solid reduced bimetallic promotor containing sorbent. Such an agent is presently preferred to be hydrogen.

Hydrogen flow in the desulfurization zone is generally such that the mole ratio of hydrogen to hydrocarbon feed is in the range of about 0.1 to about 10, and preferably in the range of about 0.2 to about 3.0.

The desulfurization zone can be any zone wherein desulfurization of the feed cracked-gasoline or diesel fuel can take place. Examples of suitable zones are fixed bed reactors, moving bed reactors, fluidized bed reactors and transport reactors. Presently, a fluidized bed reactor or a fixed bed reactor is preferred.

If desired, during the desulfurization of the vaporized fluids, diluents such as methane, carbon dioxide, flue gas, and nitrogen can be used. Thus it is not essential to the practice of the process of the present invention that a high purity hydrogen be employed in achieving the desired desulfurization of the cracked-gasoline or diesel fuel.

It is presently preferred when utilizing a fluidized system that a solid reduced bimetallic promotor containing sorbent be used that has a particle size in the range of about 20 to about 1000 micrometers. Preferably, such sorbents should have a particle size of from about 40 to about 500 micrometers. When a fixed bed system is employed for the practice of the desulfurization process of this invention, the sorbent should be such as to have a particle size in the range of about 1/32 inch to about ½ inch diameter.

It is further presently preferred to use solid reduced metals containing sorbents that have a surface area of from about 1 square meter per gram to about 1000 square meters per gram of solid sorbent.

The separation of the gaseous or vaporized desulfurized fluids and sulfurized sorbent can be accomplished by any means known in the art that can separate a solid from a gas. Examples of such means are cyclonic devices, settling chambers or other impingement devices for separating solids and gases. The desulfurized gaseous cracked-gasoline or desulfurized diesel fuel can then be recovered and preferably liquefied.

The gaseous cracked-gasoline is a composition that contains in part, olefins, aromatics and sulfur-containing compounds as well as paraffins and naphthenes.

The amount of olefins in gaseous cracked-gasoline is generally in the range of from about 10 to 35 weight percent based on the weight of the gaseous cracked-gasoline.

The amount of aromatics in gaseous cracked-gasoline is generally in the range of about 20 to about 40 weight percent based on the weight of the gaseous cracked gasoline.

The amount of sulfur in cracked-gasolines can range from about 100 parts per million sulfur by weight of the gaseous cracked-gasoline to about 10,000 parts per million sulfur by weight of the gaseous cracked-gasoline prior to the treatment of such fluids with the sorbent system of the present invention.

While enhanced olefin retention in cracked-gasolines is achieved through the use of the novel bimetallic promotor containing sorbents of the present invention for the desulfurization of a cracked-gasoline stream, the sorbents can also be used to desulfurize a diesel fuel stream, albeit while such diesel fuels do not have an olefin content, they do contain from 10 to 90 weight percent aromatics as well as having a sulfur content of from 100 parts per million to about 50,000 parts per million.

The amount of sulfur in cracked-gasolines or in diesel fuels following treatment of same in accordance with the desulfurization process of this invention is less than 100 parts per million.

In carrying out the process of this invention, if desired, a stripper unit can be inserted before the regenerator for regeneration of the sulfurized sorbent which will serve to remove a portion, preferably all, of any hydrocarbons from the sulfurized sorbent or before the hydrogen reduction zone so as to remove oxygen and sulfur dioxide from the system prior to introduction of the regenerated sorbent into the sorbent activation zone. The stripping comprises a set of conditions that includes total pressure, temperature and stripping agent partial pressure.

Preferably the total pressure in a stripper, when employed, is in a range of from about 25 psia to about 500 psia.

The temperature for such strippers can be in the range of from about 100° F. to about 1000° F.

The stripping agent is a composition that helps to remove hydrocarbons from the sulfurized solid sorbent. Presently, the preferred stripping agent is nitrogen.

The sorbent regeneration zone employs a set of conditions such that at least a portion of the sulfurized sorbent is desulfurized.

The total pressure in the regeneration zone is generally in the range of from about 10 to about 1500 psia. Presently preferred is a total pressure in the range of from about 25 psia to about 500 psia.

The sulfur removing agent partial pressure is generally in the range of from about 1 percent to about 25 percent of the total pressure.

The sulfur removing agent is a composition that helps to generate gaseous sulfur oxygen-containing compounds such as sulfur dioxide, as well as to burn off any remaining hydrocarbon deposits that might be present. Currently, oxygen-containing gases such as air are the preferred sulfur removing agent.

The temperature in the regeneration zone is generally from about 100° F. to about 1500° F. with a temperature in the range of about 800° F. to about 1200° F. being presently preferred.

The regeneration zone can be any vessel wherein the desulfurizing or regeneration of the sulfurized sorbent can take place.

The desulfurized sorbent is then reduced in an activation zone with a reducing agent so that at least a portion of the bimetallic promoter content of the sorbent composition is reduced to produce a solid reduced metal-containing sorbent having an amount of reduced metals therein to permit the removal of sulfur components from a stream of cracked-gasoline or diesel fuel.

In general, when practicing the process of this invention, the reduction of the desulfurized solid bimetallic promoter containing sorbent is carried out at a temperature in the range of about 100° F. to about 1500° F. and a pressure in the range of about 15 to 1500 psia. Such reduction is carried out for a time sufficient to achieve the desired level of metal reduction in the sorbent system. Such reduction can generally be achieved in a period of from about 0.01 to about 20 hours.

Following the activation of the regenerated particulate sorbent, at least a portion of the resulting activated (reduced) sorbent can be returned to the desulfurization unit.

When carrying out the process of the present invention in a fixed bed system, the steps of desulfurization, regeneration, stripping, and activation are accomplished in a single zone or vessel.

The desulfurized cracked-gasoline resulting from the practice of the present invention can be used in the formulation of gasoline blends to provide gasoline products suitable for commercial consumption.

The desulfurized diesel fuels resulting from the practice of the present invention can likewise be used for commercial consumption where a low sulfur-containing fuel is desired.

EXAMPLES

The following examples are intended to be illustrative of the present invention and to teach one of ordinary skill in the art to make and use the invention. These examples are not intended to limit the invention in any way.

Example I

A solid reduced nickel metal sorbent (Sorbent A, containing 30% nickel) was produced by dry mixing 20.02 pounds of diatomite silica and 25.03 pounds of zinc oxide in a mix Muller for 15 minutes to produce a first mixture. While still mixing, a solution containing 6.38 pounds of Disperal alumina (Condea), 22.5 pounds of deionized water, and 316 grams of glacial acetic acid were added to the mix Muller to produce a second mixture. After adding these components, mixing continued for an additional 30 minutes. This second mixture was then dried at 300° F. for 1 hour and then calcined at 1175° F. for 1 hour to form a third mixture. This third mixture was then particulated by granulation using a Stokes Pennwalt granulator fitted with a 50 mesh screen. The resulting granulated mixture was then impregnated with 336.9 grams of nickel nitrate hexahydrate dissolved in 44 grams of deionized water per 454 grams of granulated third mixture to produce an impregnated particulate. The impregnated mixture was dried at 300° F. for one hour and then calcined at 1175° F. for one hour to form a solid particulate nickel oxide-containing composition. 454 grams of the first nickel impregnated sorbent was subjected to a second impregnation with 336.9 grams of nickel nitrate hexahydrate dissolved in 44 grams of deionized water. After the second impregnation, once again the impregnated particulates were dried at 300° F. for one hour and then calcined at 1175° F. for one hour.

The solid nickel oxide-containing particulate was then reduced by subjecting it to a temperature of 700° F., a total pressure of 15 psia and a hydrogen partial pressure of 15 psi for 0.5 hr to produce a solid reduced nickel sorbent wherein the nickel component of the sorbent composition was reduced substantially to zero valence.

Reduction of the particulate solid calcined composition comprising zinc oxide, silica, alumina and a nickel compound so as to obtain the desired sorbent having a reduced valence nickel content is carried out in the reactor as described in Example IV.

Example II

A solid reduced cobalt metal sorbent (Sorbent B containing 30% cobalt) was produced by dry mixing 20.02 pounds of diatomite silica and 25.03 zinc oxide in a mix Muller for 15 minutes to produce a first mixture. While still mixing, a solution containing 6.38 pounds of Disperal alumina (Condea), 22.5 pounds of deionized water, and 316 grams of glacial acetic acid was added to the mix Muller to produce a second mixture. After adding these components, mixing continued for an additional 30 minutes. This second mixture was then dried at 300° F. for 16 hours and then calcined at 1175° F. for one hour to form a third mixture. This third mixture was then particulalized by granulation using a Stokes Pennwalt granulator fitted with a 50 mesh screen. 200 grams of the resulting granulated mix was then impregnated with 148 grams of cobalt nitrate hexahydrate dissolved in 43 grams of hot (200° F.) deionized water to produce a particulate impregnated mix. The impregnated particulate was dried at 300° F. for one hour and then calcined at 1175° F. for one hour. 100 grams of the calcined particulate was impregnated with a solution of 74 grams of cobalt nitrate hexahydrate dissolved in 8 grams of hot deionized water to produce an impregnated particulate product which was then dried at 300° F. for one hour and then calcined at 1175° F. for one hour to form a solid cobalt oxide sorbent.

The solid cobalt oxide sorbent was then reduced by subjecting it to a temperature of 700° F., a total pressure of 15 psia, and a hydrogen partial pressure of 15 psi for 60 minutes to produce a solid reduced cobalt sorbent wherein the cobalt component of the sorbent was reduced substantially to zero valence.

Example III

A solid reduced bimetallic nickel-cobalt sorbent (Sorbent C, containing 15% each of nickel and cobalt) was produced by dry mixing 20.02 pounds of diatomite zinc oxide in a mix Muller for 15 minutes to produce a first mixture. While still mixing, a solution containing 6.38 pounds of Disperal alumina (Condea), 22.5 pounds of deionized water, and 316 grams of glacial acetic acid was added to the mix Muller to produce a second mixture. After adding these components, mixing continued for an additional 30 minutes. This second mixture was then dried at 300° F. for 16 hours and then calcined at 1175° F. for one hour to form a third mixture. This third mixture was then particulalized by granulation using a Stokes Pennwalt granulator fitted with a 50 mesh screen. 200 grams of the resulting granulated mix was then impregnated with 148 grams of cobalt nitrate hexahydrate dissolved in 43 grams of hot (200° F.) deionized water to produce a particulate impregnated mix. The impregnated particulate was dried at 300° F. for one hour and then calcined at 1175° F. for one hour. 100 grams of the cobalt impregnated, dried, and calcined particulate was impregnated with a solution of 74.3 grams of nickel nitrate hexahydrate dissolved in 6.4 grams of hot deionized water to produce an impregnated particulate product which was then dried at 300° F. for one hour and then calcined at 1175° F. for one hour to form a solid cobalt-nickel oxide sorbent.

The solid cobalt-nickel oxide sorbent was then reduced by subjecting it to a temperature of 700° F., a total pressure of 15 psia and a hydrogen partial pressure of 15 psi for 60 minutes to produce a solid reduced cobalt-nickel sorbent wherein the cobalt-nickel component of the sorbent composition was reduced substantially to zero valence.

Reduction of the particulate solid calcined composition comprising zinc oxide, silica, alumina cobalt and a nickel compound so as to obtain the desired sorbent having a reduced valence cobalt nickel content was carried out in the reactor as described in Example IV.

Example IV

The particulate solid reduced metal sorbents as prepared in Example I–III were tested for their desulfurization ability as follows.

A 1-inch quartz reactor tube was loaded with the indicated amounts as noted below of the sorbents of Example I–III. The solid metal sorbent was placed on a frit in the middle of the reactor and subjected to reduction with hydrogen as noted in Examples I–III. Gaseous cracked-gasoline having about 345 parts per million sulfur by weight sulfur-containing compounds based on the weight of the gaseous cracked-gasoline and having about 95 weight percent thiophenic compounds (such as for example, alkyl benzothiophenes, alkyl thiophenes, benzothiophene and thiophene) based on the weight of sulfur-containing compound in the gaseous cracked-gasoline was pumped upwardly through the reactor. The rate was 13.4 milliliters per hour. This produced sulfurized solid sorbent and desulfurized gaseous-cracked gasoline.

Both Sorbent A (30% nickel) and Sorbent B (30% cobalt) were effective in removing the gasoline sulfur content from 345 ppm to about less than 5 ppm under the conditions shown in Table I. However, under the desulfurization conditions a significant loss in the olefin content was noticed, i.e. the olefin content of the gasoline was reduced from 22.0 weight percent in feed to 11.0 and 14.0 weight percent in the product when Sorbent A and Sorbent B were utilized to remove sulfur.

The invention Sorbent C was tested for two cycles. After cycle 1 the sulfurized Sorbent C was subjected to desulfurizing conditions that included a temperature of 900° F., a total pressure of 15 psia and an oxygen partial pressure of 0.6 to 3.1 psi for a time period of 1–2 hours. Such conditions are hereinafter referred to as "regeneration conditions" to produce a desulfurized bimetallic sorbent. This sorbent was then subjected to reducing conditions that included a temperature of 700° F., a total pressure of 15 psia and a hydrogen partial pressure of 15 psi for a time period of 1.25 hours. Such conditions are hereinafter referred to as "reducing conditions".

The resulting solid reduced cobalt-nickel metal sorbent composition was then used in cycle 2). Once again a reduction in sulfur content from 345 ppm to less than or equal to 5 ppm resulted when the invention Sorbent C, containing a combination of 15 weight percent each of cobalt and nickel, was tested it was unexpectedly discovered that the olefin retention was drastically improved as compared to either Sorbent A or Sorbent B which contained only nickel or cobalt respectively. Apparently an unexpected synergistic effect of the combination of the two-metals results in the olefin retention of 18.3 weight percent vs. 22.0 weight percent in the feed while in the case of Sorbent A (30 weight percent nickel) and Sorbent B (30 weight percent cobalt) the olefin content of the treated stream was reduced to 11 and 14 weight percent respectively.

The test results are set forth in Table I.

TABLE I

| Reactor Condition's | Sorbent A | Sorbent B | Sorbent C | |
|---|---|---|---|---|
| Amount (grams) | 10 | 10 | 10 | |
| TP[1] | 15 | 15 | 15 | |
| HPP[2] | 13.2 | 13.2 | 13.2 | |
| ° F. | 700 | 700 | 700 | |
| TOS[3] | | | Cycle 1 | Cycle 2 |
| 1 | <5 | 5 | <5 | 5 |
| 2 | <5 | <5 | <5 | 5 |
| 3 | <5 | <5 | <5 | <5 |
| 4 | <5 | <5 | 5 | 5 |
| 5 | | <5 | | |

TABLE I-continued

| Reactor Condition's | Sorbent A | Sorbent B | Sorbent C |
|---|---|---|---|
| Wt. % Olefins | 11.0 | 14.0 | 18.3[5] |

[1]Total pressure in psia
[2]Hydrogen partial pressure in psi
[3]The time on stream in hours
[4]The amount of sulfur-containing compounds left in the desulfurized cracked-gasoline in parts per million sulfur by wt. of the desulfurized cracked gasoline.
[5]Olefin contents measured in a composite sample from Run 1 and Run 2

Example V

A second solid reduced bimetallic nickel-copper sorbent composition containing 15% nickel and 5% copper, (Sorbent D), was prepared as follows:

363 grams of diatomite silica was mixed with 443 grams of Nyacol Al-20 alumina solution in a mix Muller. While still mixing, 454 grams of dry zinc oxide powder was then added to the above mixture and further mixed for 30 minutes to form an extrudable paste. This paste was extruded through a laboratory 1-inch Bonnot extruder employing a die containing 1/16 inch holes. The wet extrudate was dried at 300° F. for one hour and calcined at 1175° F. for one hour. 500 grams of dried extrudate were then impregnated with a solution of 371.4 grams of nickel nitrate hexahydrate dissolved in 36.5 ml of deionized water. The nickel impregnates were dried at 300° F. for one hour and then calcined at 1175° F. for one hour. 100 grams of the first nickel impregnated sorbent was subjected to a second impregnation with 19.0 grams of copper nitrate trihydrate dissolved in 27 grams of deionized water. After the second impregnation, once again the impregnated extrudates were dried at 300° F. for one hour and then calcined at 932° F. for one hour.

The extruded solid nickel oxide sorbent was ground to 12×12 mesh size particles and then reduced in the reactor by subjecting it to a temperature of 700° F., a total pressure of 15 psia and a hydrogen partial pressure of 15 psia for 2 hours to produce a solid reduced bimetallic promotor sorbent wherein the bimetallic promotor component of the sorbent was substantially reduced.

Example VI

The particulate sold reduced nickel-copper sorbent as prepared in Example V was tested for its desulfurization ability as described in Example IV. The test results shown in Table II clearly demonstrate the effectiveness of the bimetallic promotor, Sorbent D, in removing the gasoline sulfur from 345 ppm to about less than 5 ppm. It was unexpectedly discovered that the bimetallic nickel-copper sorbent effected an improved retention of olefin content (15.8 weight percent) as compared to a nickel only sorbent (11.0 weight percent). The gasoline feed contained 22.0 weight percent olefins.

The test results are set forth in Table II.

TABLE II

| Reactor Conditions | Sorbent D |
|---|---|
| Amount (g) | 10 |
| TP[1] | 15 |
| HPP[2] | 13.2 |
| ° F. | 700 |
| TOS[3] | Sulfur[4] |
| 1 | <5 |
| 2 | 5 |
| 3 | <5 |
| Wt. % Olefins | 15.8 |

[1]Total pressure in psia
[2]Hydrogen partial pressure in psi
[3]The time on stream in hours
[4]The amount of sulfur-containing compounds left in the desulfurized cracked-gasoline in parts per million sulfur by wt. of the desulfurized cracked gasoline.
[5]Olefin contents measured in a composite sample from Run 1 and Run 2

The specific examples herein disclosed are to be considered as being primarily illustrative. Various changes beyond those described will no doubt occur to those skilled in the art; and such changes are to be understood as forming a part of this invention insofar as they fall within the spirit and scope of the appended claims.

That which is claimed is:

1. A sorbent composition suitable for removal of sulfur from cracked-gasolines which is comprised of
    (a) a bimetallic promotor formed from two or more metals selected from the group consisting of nickel, cobalt, iron, manganese, copper, zinc, molybdenum, tungsten, silver, tin, antimony and vanadium; and
    (b) a particulated support which comprises zinc oxide and an inorganic or organic carrier;
    wherein said bimetallic promotor has been subjected to activation such that the valence of a substantial portion of the metals of said bimetallic promoter is zero and wherein said bimetallic promoter is present in a substantially reduced valence state and in an amount which effects the removal of sulfur from a stream of cracked-gasoline when contacted with same under desulfurization conditions.

2. A sorbent system in accordance with claim 1 wherein the ratio of the metals of said bimetallic promotor is in the range of about 20:1 to about 1:20.

3. A sorbent system in accordance with claim 2 wherein said bimetallic promotor is comprised of nickel and cobalt.

4. A sorbent system in accordance with claim 2 wherein said bimetallic promotor is comprised of nickel and copper.

5. A sorbent system in accordance with claim 3 wherein said particulate support is comprised of zinc oxide, silica and alumina.

6. A sorbent system in accordance with claim 4 wherein said particulate support is comprised of zinc oxide, silica and alumina.

7. A sorbent system in accordance with claim 5 wherein said zinc oxide is present in an amount in the range of about 10 to about 90 weight percent, said silica is present in an amount in the range of about 5 to about 85 weight percent, and said alumina is present in an amount in the range of about 5 to about 30 weight percent.

8. A sorbent system in accordance with claim 6 wherein said zinc oxide is present in an amount in the range of about 10 to about 90 weight percent, said silica is present in an amount in the range of about 5 to about 85 weight percent, and said alumina is present in an amount in the range of about 5 to about 30 weight percent.

9. A sorbent system in accordance with claim 3 wherein the ratio of nickel to cobalt is about 1:1.

10. A sorbent system in accordance with claim 4 wherein the ratio of nickel to copper is about 3:1.

11. A sorbent composition in accordance with claim 1 wherein said composition is a particulate in the form of one of granule, extrudate, tablet, sphere, pellet or microsphere.

12. A process for the production of a sorbent composition suitable for removal of sulfur from a cracked-gasoline stream which comprises:
(a) impregnating a particulate support which comprises zinc oxide and an inorganic or organic carrier with a bimetallic promotor formed from two or more metals selected from the group consisting of nickel, cobalt, iron, manganese, copper, zinc molybdenum, tungsten, silver, tin, antimony and vanadium;
(b) drying the impregnated particulate of step (a);
(c) calcining the dried particulate of step (b); and thereafter
(d) reducing the valence of the bimetallic promoter in the resulting calcined particulate of step (c) with a suitable reducing agent under suitable conditions to produce a particulate composition wherein the valence of a substantial portion of the metals of said bimetallic promoter is zero such that the reduced valence bimetallic promotor containing composition will effect the removal of sulfur from a stream of cracked-gasoline when said stream is contacted with said reduced valence bimetallic promoter under desulfurization conditions.

13. A process for the production of a sorbent composition suitable for the removal of sulfur from a cracked-gasoline stream which comprises:
(a) incorporating a bimetallic promotor formed from two or more metals selected from the group consisting of nickel, cobalt, iron, manganese, copper, zinc, molybdenum, tungsten, silver, tin, antimony and vanadium into a non-particulated support composition which comprises zinc oxide and an inorganic or organic carrier;
(b) particulating the resulting bimetallic promotor-support composition of step (a);
(c) drying the bimetallic promotor containing particulate step (b);
(d) calcining the dried bimetallic promotor containing particulate of step (c); and thereafter
(e) reducing the valence of the bimetallic promotor in the resulting calcined particulate of step (d) with a suitable reducing agent under suitable conditions to produce a particulate wherein the valence of a substantial portion of the metals of said bimetallic promotor is zero such that the reduced valence bimetallic promotor containing composition will affect the removal of sulfur from a stream of cracked-gasoline when said stream is contacted with said reduced valence bimetallic promotor under desulfurization conditions.

14. A process in accordance with claim 12 wherein the ratio of metals of said bimetallic promotor are in the range of about 20:1 to about 1:20.

15. A process in accordance with claim 13 wherein the ratio of metals of said bimetallic promotor are in the range of about 20:1 to about 1:20.

16. A process in accordance with claim 12 wherein said bimetallic promotor is comprised of nickel and cobalt.

17. A process in accordance with claim 12 wherein said bimetallic promotor is comprised of nickel and copper.

18. A process in accordance with claim 16 wherein the ratio of nickel to cobalt is about 1:1.

19. A process in accordance with claim 17 wherein the ratio of nickel to copper is about 3:1.

20. A process in accordance with claim 12 wherein said composition is in the form of a granule, extrudate, tablet, sphere, pellet or microsphere.

21. A process in accordance with claim 12 wherein said particulate is dried at a temperature in the range of about 150° F. to about 350° F.

22. A process in accordance with claim 12 wherein said particulate is calcined at a temperature in the range of about 400° F. to about 1500° F.

23. A process in accordance with claim 16 wherein said nickel and said cobalt are present in an amount in the range of about 5 to about 40 weight percent, based on the total weight of the sorbent composition.

24. The sorbent product of the process of claim 12.

25. The sorbent product of the process of claim 13.

* * * * *